UNITED STATES PATENT OFFICE 2,248,031

ABRASIVE ARTICLE AND METHOD OF MANUFACTURING THE SAME

Hugh V. Allison, Fairfield, Conn., assignor to The Allison Company, Bridgeport, Conn., a corporation of Connecticut No Drawing. Application November 2, 1940, Serial No. 363,980

14 Claims. (Cl. 51—299)

This invention relates to new and useful improvements in abrasive articles and to the method of manufacturing the same.

The objects and advantages of the invention will become apparent from a consideration of the following detailed description wherein the invention is disclosed. However, it is to be understood that the invention is not limited to the details set forth herein but includes all such variations and modifications as fall within the spirit of the invention and the scope of the appended claims.

I have found that a very advantageous bond for abrasives is obtained by reacting together, preferably in the presence of heat and a catalyst, an unsaturated organic material, and an organic material containing the alpha-beta enal grouping in its molecule.

For my unsaturated system

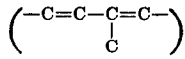

I employ rubber (by which term I include rubber in all modifications as well as substitutes or artificial rubbers) while for my unsaturated carbonyl compound (the organic material containing the alpha-beta enal grouping in its molecule) I preferably employ maleic anhydride although I may use other compounds containing the grouping

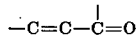

while for my catalyst I at present prefer lauryl peroxide I may in lieu thereof use benzoyl peroxide or various lead oxides or other oxidizing agents.

The present invention provides a bonding agent, suitable for grinding wheels, which has more resistance to heat than the rubber bonds heretofore in use and at the same time has other advantages recognized in the present rubber bonds. Additionally the herein disclosed method of manufacture has many advantages over the methods heretofore disclosed.

My work shows that when maleic anhydride is mixed with rubber and a suitable catalyst heating of the mixture brings about a reaction forming products varying in properties according to the conditions under which the reaction is carried out. These reaction products may be classified as rubber resins and have great usefulness as bonds for abrasive articles since the properties of the reaction products may be varied between wide limits.

In practicing the invention (the following is to be considered merely as an example) smoked sheet rubber is broken down either in a roll type or an internal type mixer until it is in a plastic state. To the rubber while in the mixer is added from 3% to 20% monomeric liquid styrene. The styrene is added to render the mass more plastic and also to aid in the later liquefying of the rubber as will appear.

On removal from the mixer the mass is placed in a closed pressure vessel and heated to a temperature of from 200 to 400 degrees centigrade. By means of air or some inert gas the pressure in the vessel is maintained at from 20 to 50 pounds. The heat is applied until the mass is reduced to a fluid and the time required depends on the quantity of the mass, the pressure applied and the percentage of the plasticizer (styrene) used. After the liquid stage is reached the material may be drawn off and allowed to cool and at this point resembles a heavy molasses.

If the fluid has been allowed to cool below such temperature it is now warmed to a temperature of from 60 to 70 degrees centigrade and then from one to twenty parts of maleic anhydride are added and stirred or otherwise mixed into the fluid. Following thorough incorporation of the maleic anhydride into the fluid mass from one to ten parts of the catalyst is added. Now the mass is heated (the heat is continued at 60 to 70 degrees) and stirred.

The amount of the catalyst and anhydride used is determined by the quality of product desired. Maintaining of the temperature within or approximately within the limits above stated is of importance as the reaction will become too vigorous and gassing will result if the temperature becomes too high while should the temperature be too low the maleic anhydride will solidify out of the mass. After the reaction between the maleic anhydride and the rubber has occurred the mass is allowed to cool. The mass may no longer be called a fluid rubber as its properties are markedly different from those of rubber.

Simply by varying the proportions of catalyst and the proportions of maleic anhydride used, products may be obtained ranging from fluids to hard solid masses. In general for a given amount of maleic anhydride used the viscosity of the mass is increased as the amount of the catalyst is increased. Also when the proportion of the catalyst is kept constant the viscosity of the material increases as the anhydride content is increased. The following table and its explanation verifies these conclusions:

| No. | Fluid rubber content | Maleic anhydride content | Lauryl peroxide |
|---|---|---|---|
| 8 | 100 | 5 | 1 |
| 9 | 100 | 5 | 2 |
| 10 | 100 | 5 | 5 |
| 11 | 100 | 5 | 10 |
| 12 | 100 | 10 | 1 |
| 13 | 100 | 10 | 2 |
| 14 | 100 | 10 | 5 |
| 15 | 100 | 10 | 10 |
| 16 | 100 | 20 | 1 |
| 17 | 100 | 20 | 2 |
| 18 | 100 | 20 | 5 |
| 19 | 100 | 20 | 10 |

Referring to the foregoing table the mixes numbered 11, 15 and 19 are all solid masses while those numbered 8, 12 and 16 are all viscous masses and mix numbered 16 is more viscous than mix numbered 8. Mixes numbered 9, 13 and 17 are viscous masses but are more viscous than those numbered 8, 12 and 16 respectively. Mix numbered 17 is difficult to stir and mix numbered 10 is more viscous than number 9 and less viscous than number 11 while mixes numbered 14 and 18 are masses very difficult to stir.

The rubber resins of the invention, unlike fluid rubber, do not decrease rapidly in viscosity as they are heated. It is further noted that the chemical unsaturation is reduced from that present in fluid rubber. Explanation of the viscous qualities of the various rubber resins of the invention is difficult. They are somewhat stringy in their nature. That is, if a rod is placed in a mass of the rubber resin and then withdrawn long fibrous strings remain attached to the rod and extend to the mass. These strings are elastic and tacky.

An important point to be noted is that the maleic anhydride in addition to reacting with the rubber reacts with the styrene thus eliminating any necessity for removing the styrene from the mass. Thus the plasticizer in the present invention is not driven off from the bond prior to the completion of the article being made and is in fact reacted with the mass and becomes a permanent part of the bond.

Having by the above process produced a rubber resin of the desired properties the process of manufacturing abrasive articles is continued in the following manner. Through the use of a dough type mixer or otherwise as may be desired, sulfur, fillers, and abrasive grain are mixed with the viscous, stringy rubber resin. After thorough mixing of the mass articles are shaped from it in any desired way, as by molding, and then cured. The curing may be effected by vulcanization during which it is desirable to maintain a pressure in the vulcanization chamber to prevent "blowing" in such articles as are being made.

In making an abrasive article according to the present invention the following specific formula may be used. 1000 grams of smoked sheet rubber is broken down and mixed with 30 grams of monomeric liquid styrene as on a mill. The mass thus prepared is placed in a vessel under 20 pounds of air pressure. Heat is applied until the mass is in a liquid state. This requires from one to two hours at a temperature of from 200 to 250 degrees centigrade.

To 100 grams of the resulting fluid at 60 degrees centigrade are added and mixed 5 grams of maleic anhydride and 2 grams of lauryl peroxide. After heating for about ten minutes at the mentioned temperatures the mass is cooled and allowed to remain at room temperature for approximately 12 hours. Then to 75 grams of the cooled mass are added and thoroughly mixed 75 grams of sulfur and 850 grams of number 90 aluminum oxide abrasive. After a thorough mixing a disc three-eighths inch in thickness and of a diameter of four inches is pressed from the mass and vulcanized in a chamber under fifty pounds of air pressure for about ten hours at a temperature of 160 degrees centigrade. The product obtained is a hard, black, shiny, free cutting abrasive wheel.

As a variation of the foregoing example fillers and resins, as resins of the thermo-setting type, may be added along with the abrasive grain.

The abrasive articles of the invention have many advantages over similar articles made by previously known methods. First the hardness of the resultant articles may be readily and accurately controlled by varying the amount of the catalyst and/or the amount of the maleic anhydride. Second the rubber resin bond of the invention is more resistant to heat than rubber bonds heretofore known. Third the distribution of the abrasive grains in the articles is more uniform because the greater viscosity and tack of the rubber resin allows for a more thorough mixing of the abrasive grit in the mass.

My present method provides for a rapid reduction of the rubber to a fluid state through the use of the solvent plasticizer and yet it is not necessary to remove the plasticizer from the mass as it reacts chemically with the mass to form a resin and remains in the finished article without injury to its quality. Blanks formed of abrasive and my rubber resin are more readily handled before curing without danger of deforming than are blanks formed of the fluid rubber abrasive mixes heretofore known.

The invention is not limited to the details given above as the foregoing disclosure is for the purpose of setting forth the principles of the invention and not its limitations. The method may be varied and similar results obtained. Thus other methods may be used for the purpose of securing the fluid rubber used in practicing the invention. Should the crude smoked sheet rubber be reduced to a fluid by the use of heat alone the maleic anhydride may be reacted with such fluid rubber. However, when the plasticizer is omitted more time is required to reduce the rubber to the fluid condition.

Solvents such as gasoline, carbon tetrachloride, naphthalene and the like may be used to replace the monomeric liquid styrene. However, the maleic anhydride will not react with these solvents or plasticizers and they must be removed at some point in the process as otherwise they detract from the quality of the final product. I have found that no solvent or plasticizer is necessary in order that the maleic anhydride react as above set forth. That is the rubber does not have to be in a fluid state. The anhydride may be added directly to the rubber while on the mill, but this method is not entirely satisfactory owing to the toxic nature of the maleic anhydride.

Other carbonyl compounds may be used in place of the maleic anhydride. For example acrolein may be used with the proper catalyst and under the proper conditions for reaction. However, maleic anhydride is preferred because of the difficulties of processing with acrolein and the slowness with which the reaction proceeds when acrolein is used. Quinone, a chemical capable of reacting with conjugated dienes is not desirable for the present process owing to its property of rapid sublimation under heat.

When the monomeric liquid styrene is used a small quantity of a negative catalyst may be used to prevent its polymerization before the desired time. Examples of such inhibitors are sulfur, hydroquinone, cresol, and pyrogallol. As above suggested the catalyst used to promote the reaction between the maleic anhydride and the other ingredients are in general oxidizing agents. Thus benzoyl peroxide, lauryl peroxide and various lead oxides may be used.

The results obtained by the practice of the above method may be explained by assuming that an additional reaction occurs between the unsaturated hydrocarbon system (the fluid rubber) and the alpha-beta unsaturated carbonyl compound (as the maleic anhydride). If the styrene is present as a plasticizer in the fluid rubber mass, heteropolymerization occurs between the styrene and the anhydride to form a resinous product.

Having thus set forth the nature of my invention, what I claim is:

1. The method of making an abrasive article comprising reducing rubber to a fluid, forming a heteropolymer by reacting said fluid with an alpha-beta unsaturated carbonyl compound while retaining the mass at a temperature of approximately between 60 and 70 degrees centigrade, mixing abrasive grain and sulfur with said heteropolymer, shaping articles from the mass, and curing the shaped articles.

2. The method of making an abrasive article comprising breaking down rubber in a mill, mixing a plasticizer with the rubber during the breaking down thereof, heating the plasticized rubber to reduce it to a fluid, reacting the fluid with maleic anhydride through the use of heat and a catalyst to form a heteropolymer, mixing abrasive grain and sulfur with said heteropolymer, shaping articles from the mass thus obtained, and curing the shaped articles under heat and pressure.

3. An abrasive article comprising abrasive grain and a bond comprising a reaction product of rubber, maleic anhydride and said maleic anhydride being present in the proportion of from one to twenty percent based on the rubber content and depending on the hardness desired in the bond.

4. An abrasive article comprising abrasive grain and a bond therefor comprising a heteropolymer of an alpha-beta unsaturated carbonyl compound and a partially depolymerized rubber.

5. An abrasive article comprising abrasive grain and a bond therefor comprising a heteropolymer of an alpha-beta unsaturated carbonyl compound and liquid rubber.

6. An abrasive article comprising abrasive grain and a bond therefor comprising a heteropolymer of maleic anhydride and a partially depolymerized rubber.

7. An abrasive article comprising abrasive grain and a bond therefor comprising a heteropolymer of maleic anhydride and liquid rubber.

8. The method of making an abrasive article comprising partially depolymerizing rubber, producing a heteropolymer by reacting said partially depolymerized rubber with maleic anhydride, mixing abrasive grain and a curing agent in said heteropolymer, shaping articles from the mass, and curing the shaped articles.

9. The method of making an abrasive article comprising partially depolymerizing rubber, producing a heteropolymer by reacting said partially depolymerized rubber with an alpha-beta unsaturated carbonyl compound, mixing abrasive grain and a curing agent in said heteropolymer, shaping articles from the mass, and curing the shaped articles.

10. The method of making an abrasive article comprising producing a heteropolymer of fluid rubber and an alpha-beta unsaturated carbonyl compound, mixing abrasive grain and a curing agent in said heteropolymer, shaping articles from the mass, and curing the shaped articles.

11. The method of making an abrasive article comprising producing a heteropolymer of fluid rubber and maleic anhydride, mixing abrasive grain and a curing agent in said heteropolymer, shaping articles from the mass and curing the shaped articles.

12. The method of making abrasive articles comprising partially depolymerizing rubber, adding to the depolymerized rubber an agent which reacts chemically therewith to increase the viscosity of the mass, mixing into the mass abrasive grain and a curing agent, shaping articles from the mass, and then curing the shaped articles.

13. The method of making abrasive articles comprising reducing a conjugated diene to a fluid by the use of a solvent, reacting said fluid with an alpha-beta unsaturated carbonyl compound in the presence of heat to form a resin, mixing abrasive grain and sulfur with said resin, shaping articles from the mass, curing the shaped articles, and at the desired point in said process removing said solvent.

14. The method of making abrasive articles comprising reducing a conjugated diene to a fluid by means of monomeric liquid styrene and heat, reacting said fluid with an alpha-beta unsaturated carbonyl compound without removing said monomeric liquid styrene to form a resin, mixing abrasive grain and sulfur with said resin, shaping articles from the mass, and curing such articles.

HUGH V. ALLISON.